June 2, 1964  W. J. READING  3,135,386
EGG GRADING DEVICE
Original Filed Sept. 14, 1955  6 Sheets-Sheet 1

INVENTOR:
WALTER J. READING
BY:
Beau, Brooks, Buckley & Beau
ATTORNEYS.

June 2, 1964  W. J. READING  3,135,386
EGG GRADING DEVICE

Original Filed Sept. 14, 1955  6 Sheets-Sheet 2

June 2, 1964 W. J. READING 3,135,386
EGG GRADING DEVICE
Original Filed Sept. 14, 1955 6 Sheets-Sheet 3

INVENTOR:
WALTER J. READING
BY:
Beau, Brooks, Buckley & Beau
ATTORNEYS.

June 2, 1964  W. J. READING  3,135,386
EGG GRADING DEVICE

Original Filed Sept. 14, 1955  6 Sheets—Sheet 4

INVENTOR:
WALTER J. READING

BY:
Beau, Brooks, Buckley & Beau.
ATTORNEYS

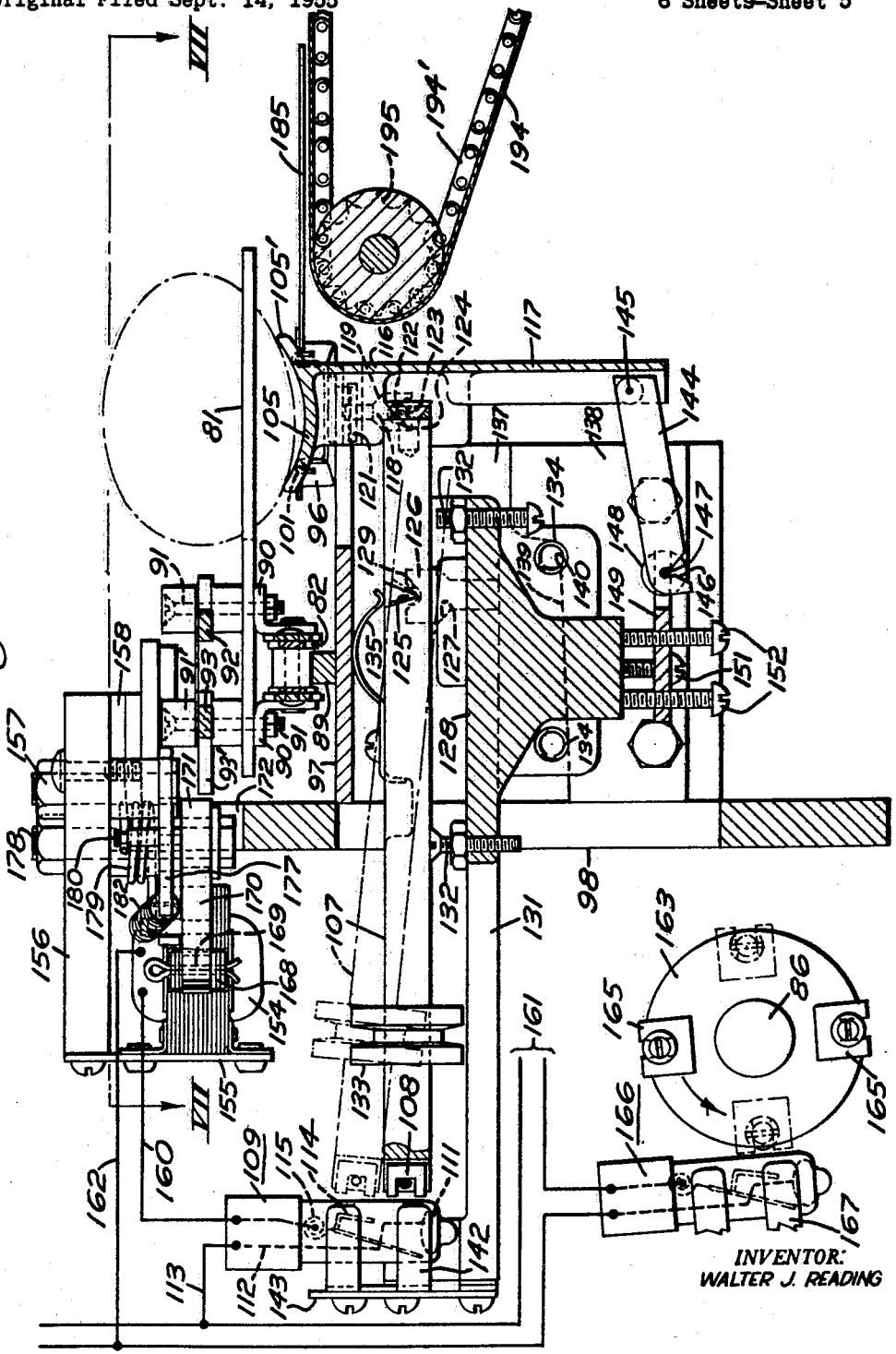

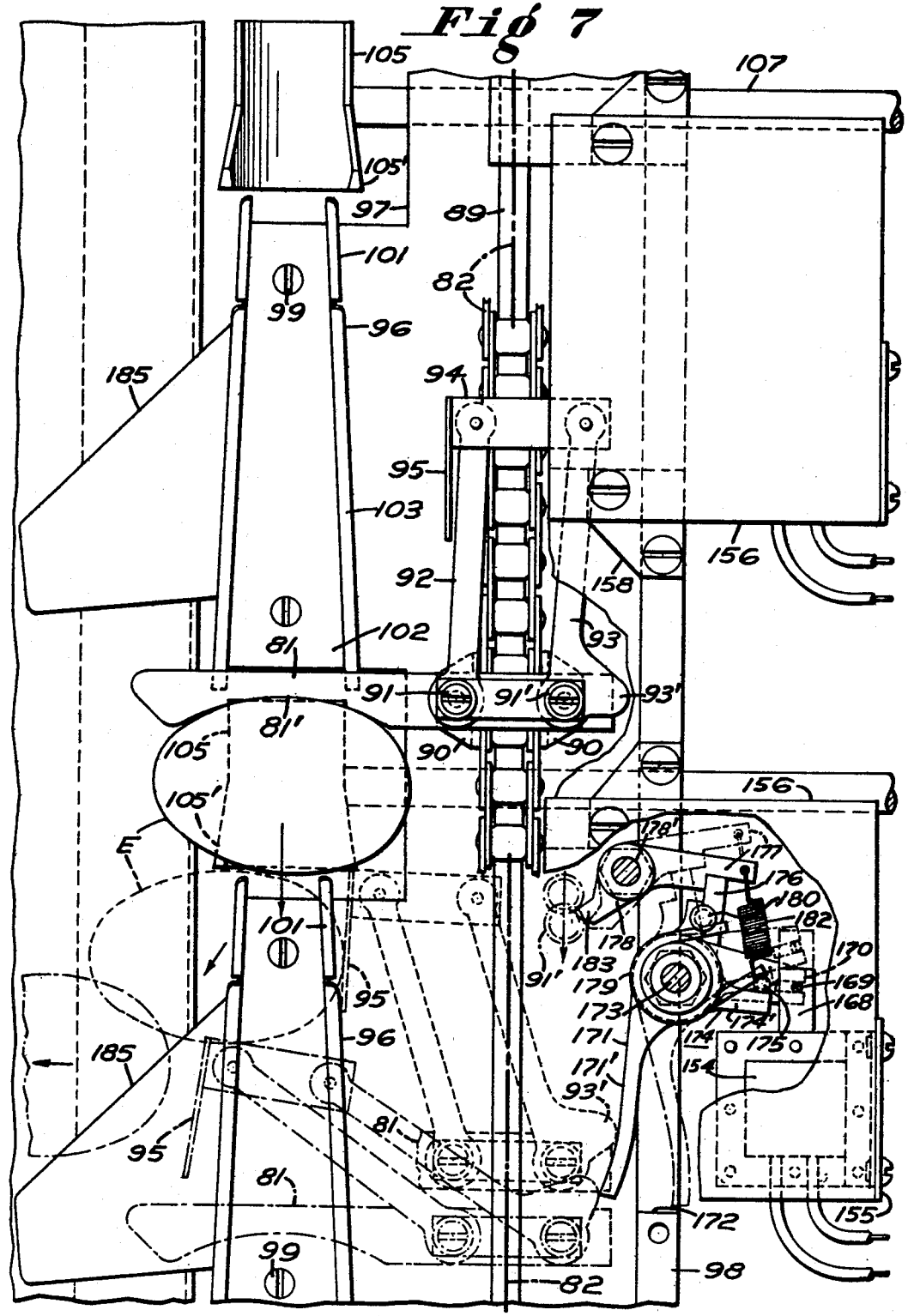

United States Patent Office 3,135,386
Patented June 2, 1964

3,135,386
EGG GRADING DEVICE
Walter J. Reading, Rte. 1, Agency Road, Ottumwa, Iowa
Original application Sept. 14, 1955, Ser. No. 534,271, now Patent No. 2,961,087, dated Nov. 22, 1960. Divided and this application Oct. 10, 1960, Ser. No. 61,585
10 Claims. (Cl. 209—121)

This invention relates generally to the measuring and classifying art, and more particularly to a new and useful machine for grading eggs according to weight. This application is a division of my co-pending application Serial No. 534,271, filed September 14, 1955, now Patent No. 2,961,087.

The primary object of my invention is to provide new and improved means for weighing eggs as an integral part of an apparatus which orients, grades and packs eggs which may be fed to the apparatus in random fashion, all without need of any manual procedures.

Another object of my invention is to provide a machine that will grade a large number of eggs rapidly and with a very high degree of accuracy.

Another object of the invention is to provide an egg grader characterized by the provision of a main conveyor and grading section having a main track comprising track sections spaced apart in end-to-end relation and weighing scale platforms therebetween, and pusher members defining egg receiving spaces along the main track with the trailing pusher member of each space pushing the egg therein onto successive track sections, the egg rolling along the track sections free of both pusher members and engaging the forward pusher member of its space in time to be lowered gently thereby from the track section onto the weighing scale platform.

An egg grader in accord with my invention is characterized in another aspect thereof by the provision of a solenoid actuated ejector trip mechanism, with a timer switch in the energizing circuit thereof and a second switch associated with the weighing scale for being closed by movement thereof and arranged in series with the timer switch in the energizing circuit, the timer switch closing only during the interval when the egg is on the weighing platform free of the two pusher members defining the space occupied by the egg.

In still another aspect thereof, an egg grader in accord with my invention is characterized by the provision of a novel ejector mechanism operable after the egg has been moved from the scale platform onto the next track section to push the egg across the track section and substantially level onto an egg receiving member.

An egg grader in accord with my invention is characterized in still another aspect thereof by the provision of a novel solenoid actuated ejector trip mechanism having means yieldably locking the mechanism in tripping position and releasing the same after the egg ejecting action.

The foregoing and other objects, advantages and characterizing features of an egg grader according to my invention will become clearly apparent from the ensuing detailed description of a presently preferred embodiment thereof, reference being made to the accompanying drawings illustrating such embodiment and forming a part of said description and wherein:

FIGS. 1a and 1b are schematic views illustrating the manner in which eggs are aligned by the infeed conveyor, FIG. 1a illustrating the initial attitude assumed by the eggs and FIG. 1b showing the position thereof after about three turns of the conveyor rollers;

FIG. 6 is a transverse sectional view of the main conveyor and grading section, showing a weighing scale and ejector mechanism;

FIG. 7 is a plan view, with certain parts broken away and others shown in section, taken about on line VII—VII of FIG. 6 and illustrating in detail the egg ejector mechanism;

Figure 1:
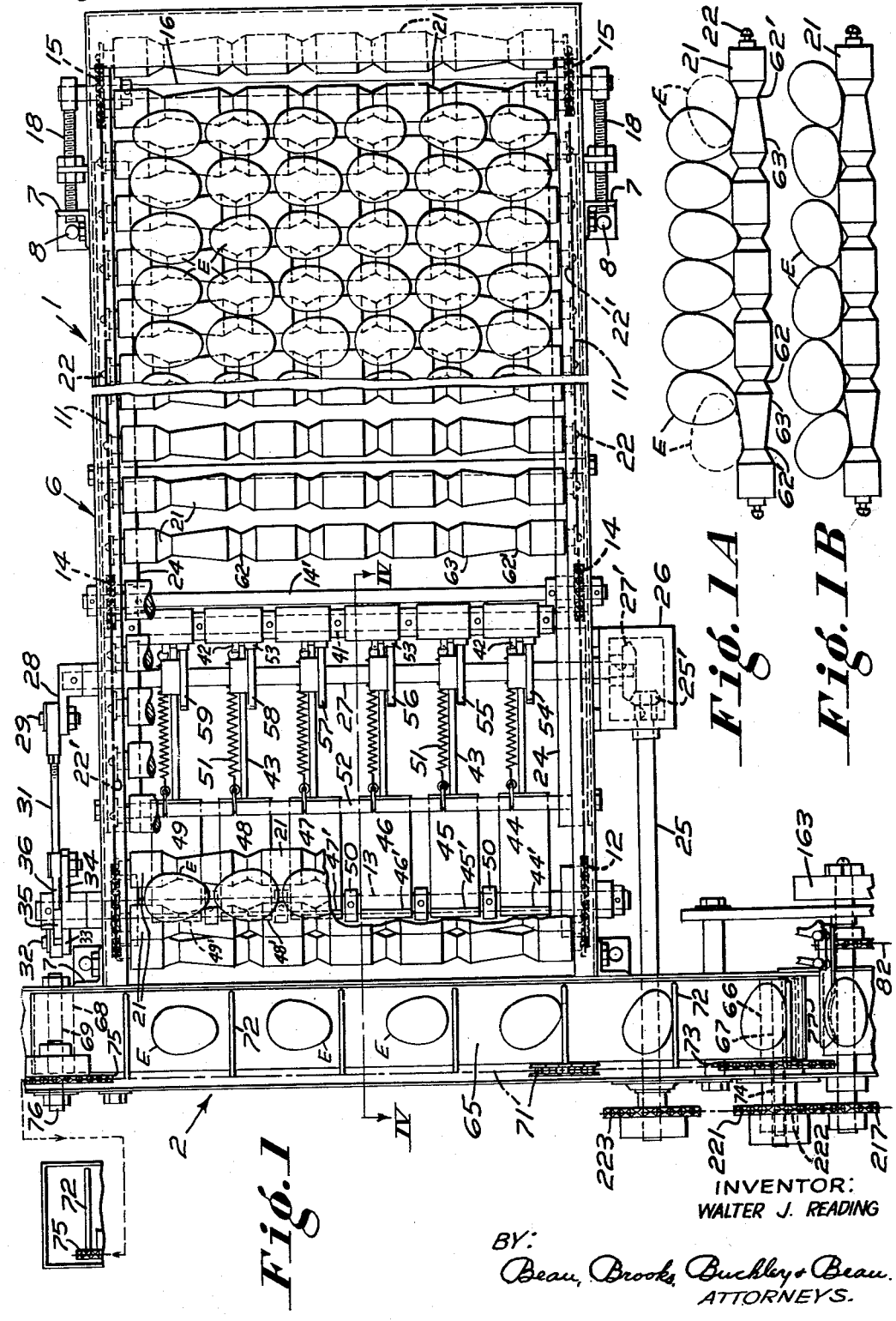
FIG. 1 is a plan view of the infeed conveyor and the cross feed conveyor, the infeed conveyor being shown after the transfer of eggs to the cross feed conveyor and at the beginning of its next movement, certain parts being broken away for greater clarity and for ease of illustration.

Briefly stated, the construction and operation of the illustrated grader is as follows. The eggs to be graded are placed on an infeed conveyor, generally designated 1 (FIG. 1) by any appropriate means, not illustrated, and conveyor 1 delivers these eggs on to a cross feed conveyor, generally designated 2 (FIG. 1) which in turn delivers them to the main conveyor and grading section, generally designated 3 (FIG. 2). The eggs are weighed as they move along the grading section 3, and they are ejected therefrom onto appropriate areas of the candling conveyor and table, generally designated 4 (FIG. 2). This operation is continuous, and the complete mechanism is shown in plan, in FIGS. 1 and 2 when the upper right hand corner of the latter is aligned with the lower left hand corner of the former.

Referring now particularly to FIGS. 1, 1a, 1b, 3 and 4, the infeed conveyor 1 is contained in a hollow, rectangular box-like framework, generally designated 6, which is supported off the floor by the angle member legs 7 which preferably are individually adjustable as to length to enable height and leveling adjustments of the framework 6, the adjustment being accomplished for example by a bolt 8 threaded into the lower end of each leg 7 for movement in opposite directions longitudinally thereof and lock nuts 9 for securing the same in adjusted position.

The conveyor proper comprises a pair of endless roller chains 11 passing over drive sprockets 12 carried by the shaft 13, idler sprockets 14 carried by a shaft 14', and tightener sprockets 15 carried by a shaft 16. Drive sprockets 12 and tightener sprockets 15 determine the upper, egg-conveying flight of the conveyor, and shaft 16 is movable toward and away from the drive shaft 13, by adjusting the length of members 18, to maintain the desired tension on the chains 11.

An endless series of egg-carrying rollers 21 is carried between the drive chains 11, the individual rollers 21 extending transversely of the infeed conveyor between the two chains 11 and being attached thereto for movement therewith as by means of screws 22 or the like connecting the rollers to upstanding brackets 22' carried by the chains, the rollers 21 being free to turn and rotate about their longitudinal axis. Preferably, I use wooden rollers covered with a layer 23 of cushioning and gripping material such as rubber.

The conveyor is arranged to carry several eggs between each pair of adjacent rollers 21, and adjacent rollers are attached to the chain to provide sufficient room for an egg to lay lengthwise thereon and therebetween. For example, in the illustrated embodiment the rollers are attached to the chains every one and seven-eighths inch which is approximately the diameter of an average egg.

Along the upper, egg-conveying flight of the conveyor the rollers 21 ride on angle irons 24, carried by the framework 6, which form a track therefor. The rollers are pulled along the track by the chains 11 and roll along the track because of the contact therewith. The conveyor is unsupported on its return flight.

Thus, eggs are received by the infeed conveyor adjacent the outer end of its egg-conveying flight, remote from the cross-feed conveyor 2, and are conveyed thereby in the direction of the arrows (FIG. 4) to a transfer station adjacent the cross feed conveyor 2, and it is a feature of my invention that the infeed conveyor moves with a step-by-step motion, being halted momentarily between each movement, whereby the rollers 21 roll along the tracks 24 with an intermittent motion, intermittently rotating the eggs E carried thereby about their long axis to place successive substantially half sections of each egg uppermost for visual inspection by the operator.

In other words, the infeed conveyor is driven from the shaft 25, which rotates continuously during operation of the grader, through a speed reduction gear box 26 and a shaft 27 journaled on the frame 6, the shafts 25 and 27 carrying intermeshing bevel gears 25' and 27', respectively. Shaft 27 extends through the opposite side of the conveyor frame 6 and carries at that end a crank 28 (FIGS. 1 and 3) having at its outer end a pin 29 pivotally supporting a length-adjustable connecting rod 31 at one end thereof. At its other end, connecting rod 31 is pivotally connected, as at 32, to one arm 33 of a bellcrank 34 which is loosely pivoted on the infeed conveyor drive shaft 13. A ratchet wheel 35 is carried by shaft 13 for movement therewith, and is intermittently engaged by a pawl 36 carried by the other arm of the bellcrank 34. Therefore, as shaft 27 rotates crank 28 in the direction of the arrow, from the full line position thereof shown in FIG. 3, the connecting rod 31 is retracted, causing pawl 36 to advance ratchet wheel 36, and then is extended, causing pawl 36 to retract over the teeth of the ratchet wheel. The conveyor moves each time ratchet wheel 35 is advanced, and by adjusting the length of rod 31 the distance traveled by the conveyor rollers 21 during each revolution of crank 28 can be adjusted to properly index the conveyor with relation to the egg transfer mechanism associated therewith. When properly indexed, the infeed conveyor advances the distance between the centers of adjacent rollers during each movement, which is one and seven-eighths inch in the example given herein.

As previously noted, by advancing the infeed conveyor with a step-by-step motion, so that the conveyor moves only the distance between the axes of adjacent rollers with each movement, successive substantially half sections of the eggs on the conveyor are faced upwardly momentarily to facilitate visual inspection thereof for purposes of removing eggs which are dirty, or checked, and particularly leakers, which eggs might foul the mechanism and impair the operation thereof.

As previously noted, successive pairs of adjacent conveyor rollers 21 are intermittently advanced to, and then momentarily halted at, a transfer station adjacent cross feed conveyor 2, and for purposes of identifying the location of this station the pair of adjacent rollers at that station are referred to as 21' (FIG. 4), it being understood that these rollers 21' are identical with the other rollers 21 and are given primes only to identify the point or station at which eggs are transferred from the infeed conveyor to the cross feed conveyor.

After each pair of adjacent rollers 21 has been brought to the transfer station they remain there while the crank 28 completes its revolution, and during this time transfer means (FIGS. 1 and 4) are actuated to push the eggs from the infeed conveyor rollers 21' onto the cross feed conveyor 2, as follows.

Adjacent the shaft 27 there is positioned another shaft 41 loosely pivotally carrying a number of crank arms 42 equal to the number of eggs E which can be carried by each pair of adjacent rollers 21, herein illustrated as being six in number. A link 43 is pivotally connected to the lower end of each crank 42, and at its outer end each link carries a pusher plate, all of which are identical but which are herein designated 44 through 49. The pusher plates rest on the shaft 13, between guide collars 50, and each pusher plate has a tip 44' through 49', respectively, of rubber or other suitable cushioning material.

Figure 4:
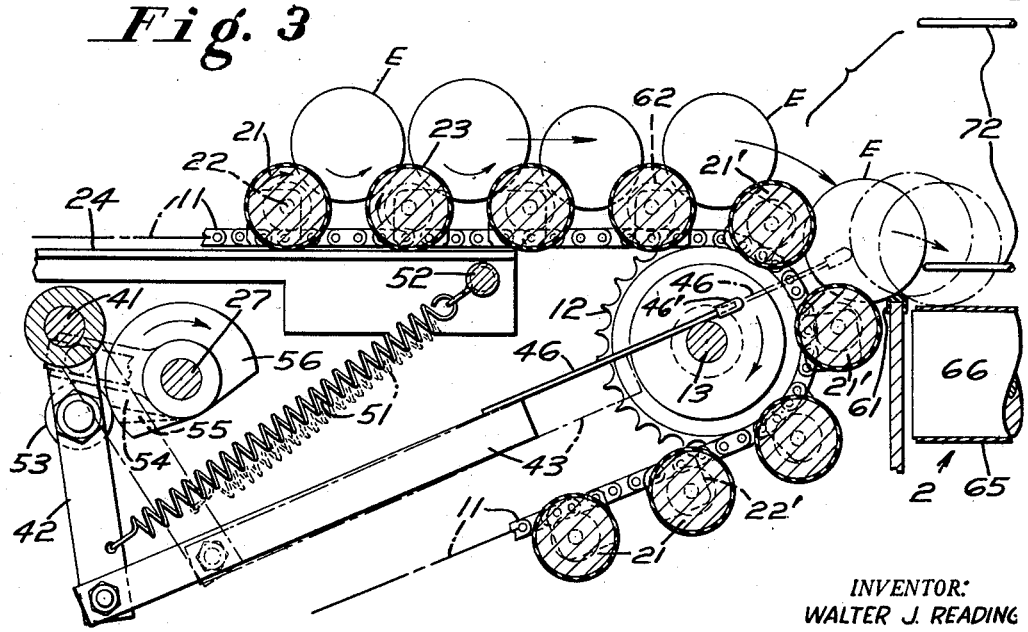
FIG. 4 is a transverse sectional view taken about on line IV—IV of FIG. 1 but showing the parts in the position which they assume just prior to transfer of the eggs from the infeed conveyor to the cross feed conveyor.

Each pusher plate is biased toward its projected position between the pair of adjacent rollers 21' at the transfer station, illustrated in broken lines in FIG. 4, by a spring 51 extending between the associated crank arm 42 and a fixed rod 52, and intermediate its ends each crank arm 42 carries a roller 53.

During each movement of the infeed conveyor, the pusher plates 44 through 49 are held retracted, and between each movement of the infeed conveyor the pusher plates are projected through the pair of adjacent rollers 21' at the transfer station to push the eggs therefrom in sequence onto the cross feed conveyor 2. This is accomplished by means of cams 54 through 59, corresponding to the pusher plates 44 through 49, respectively, which are carried by the shaft 27 for rotation therewith. The rollers 53 carried by the crank arms 42 are held against their associated cams 54 through 59 by the springs 51, and the cams 54 through 59 have identical high and low portions excepting only that their high portions differ as to length.

Thus, looking for example at FIG. 4 which shows cam 56 and, therebehind, cams 55 and 54, assume that crank 28 has moved through its drive stroke, advancing the conveyor and bringing a pair of adjacent rollers 21' to the transfer station, and now is rotating through its idling stroke with respect to the conveyor, with pawl 36 retreating over the ratchet wheel teeth. It will be noted from FIG. 4 that the leading edges of the high portions of cams 54–59 begin at the same point, so that all of the pusher plates 44–49 are retracted simultaneously to their full line position in FIG. 4 by the high portions of their respective cams 54–59 simultaneously bearing against the rollers 53. However, the trailing edge of the high portions of the respective cams 54–59 do not coincide, but instead in point of time the high portion of cam 54 terminates first, followed by the high portions of cams 55–59 in that order.

Therefore, when the conveyor momentarily halts, cam 54 is the first to permit its associated roller 53 to advance and thereby allow its associated spring 51 to project pusher plate 44 between rollers 21' to the position thereof illustrated in broken lines in FIG. 4, this action being repeated by the remaining cams and pusher plates in numerical order. As pusher plates 44–49 project between rollers 21' they push the eggs carried thereby up over a slight ledge 61 covered by cushioning material such as rubber onto the conveyor 2. When the last pusher 49 has been projected, all of the pushers 44–49 are retracted simultaneously and the machine again indexes, bringing the next pair of adjacent rollers to the transfer station following which the foregoing pusher operation is repeated. Also, it should be noted that pushers 44–49 are projected by spring action, whereby if the conveyor is not properly indexed the transfer mechanism will not be broken.

It is believed that this represents a very significant advantage of an egg grader in accord with my invention. The practice has been to convey the eggs at a constant speed and permit them to tumble onto the next conveyor mechanism at random, whereby the eggs often hit each other and are checked or broken. In accord with my invention, a number of eggs are brought to the transfer station simultaneously and then the conveyor stops momentarily, the eggs then being carefully pushed off onto the next conveyor in a predetermined order with the sequence of operation of the pushers being in a direction opposite to the direction of travel of the cross feed conveyor, whereby the eggs are gently transferred onto the cross feed conveyor in a positive manner precluding accidental contact therebetween and wherein, as will more clearly appear hereinafter, the eggs occupy separate spaces on the cross feed conveyor.

There is still another feature of my infeed conveyor which is worthy of note, and that is the manner in which the eggs are automatically spread out and aligned longitudinally of the rollers on which they are carried.

In practice, quite frequently a large number of eggs will be deposited on the infeed conveyor simultaneously with the eggs initially assuming an upright position or attitude, as illustrated in FIG. 1a. This will occur, for example, when a conventional egg lifter is used, lifting as many as three dozen eggs at a time from a case and depositing them on the infeed conveyor. However, the eggs must be spread out and aligned longitudinally of the rollers 21 in a predetermined position for proper operation of the pushers and to facilitate inspection. Therefore, in accord with my invention the conveyor rollers 21 have a series of circumferential grooves therearound spaced apart lengthwise thereof and equal in number to the number of eggs to be carried by each pair of adjacent rollers. The inner grooves 62 are symmetrical and of generally V-shaped cross section, while the two outermost grooves 62' are unsymmetrical with the inner wall 63 thereof having a considerably lesser slope than the other wall and extending over substantially to the adjacent groove 62. For purposes of illustration, it is noted that in the embodiment disclosed herein the grooves 62 are equally spaced apart along the rollers, and that the outside edges of the two remote grooves 62 on each roller are approximately eight and one-half inches apart.

The eggs are initially deposited on the rollers 21 in somewhat the manner illustrated in FIG. 1a, and it will be noted that the centers of the two outside eggs are deposited on the elongated, tapering wall surfaces 63 of the unsymmetrical outer grooves 62', just inside the edge thereof. Therefore, as soon as the egg lifting mechanism is removed the two outermost eggs in each row will either fall or slide over on their sides, to the position illustrated in broken lines in FIG. 1a, which starts to spread the eggs apart, and after the conveyor has indexed three or four times the eggs will be generally aligned lengthwise of the rollers in the manner shown in FIG. 1b.

This is important because much better inspection of the eggs is obtained when they are lying on their sides, and because the eggs must assume a predetermined position for proper operation of the pushers 44-49. Also, the corresponding grooves 62 and 62' of adjacent rollers 21 are aligned in the direction of conveyor movement and thereby define an intermittently rotating track rotating each egg and carrying it along in proper positional alignment with respect to the respective one of pushers 44-49 associated therewith.

Figure 2:
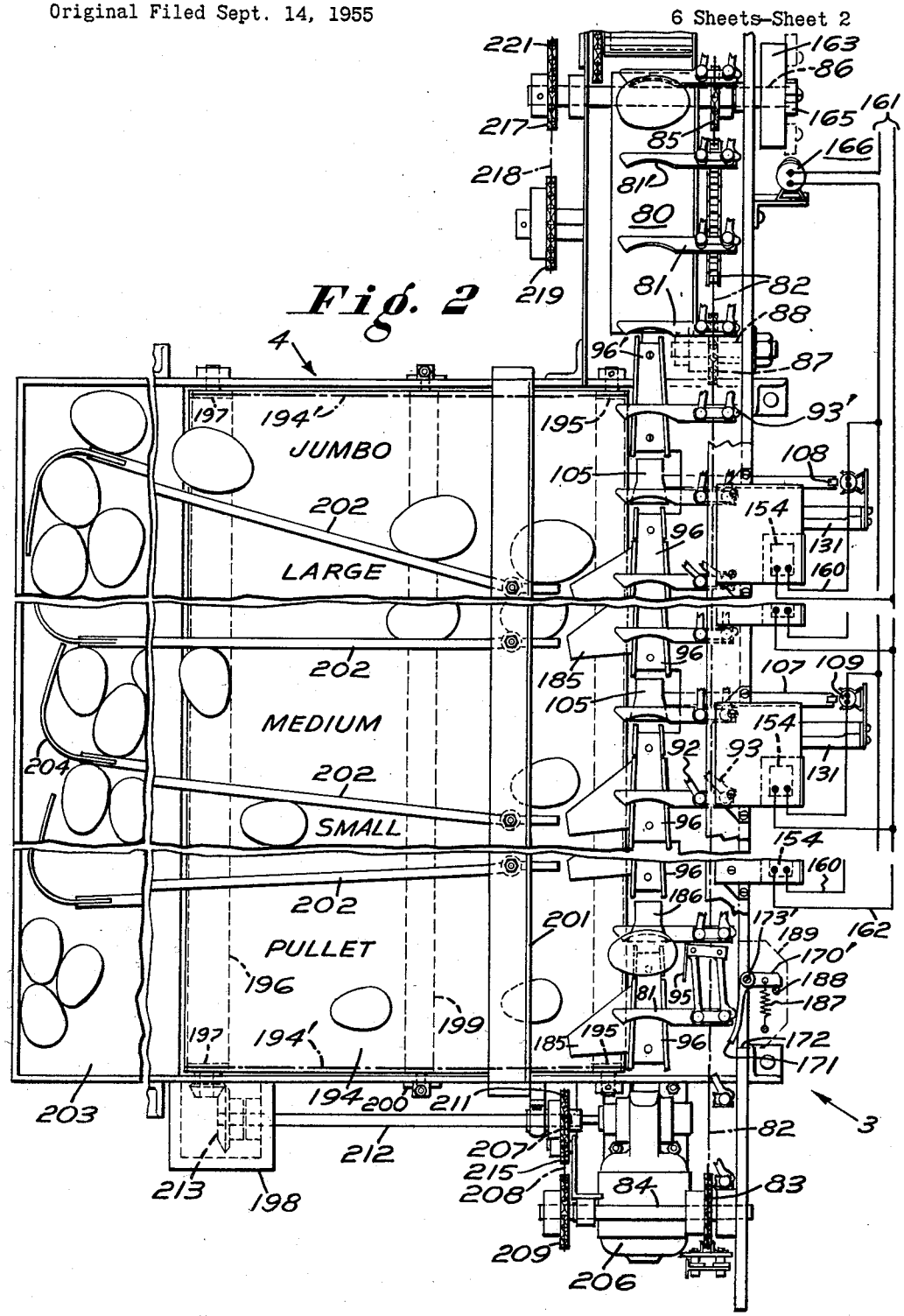
FIG. 2 is a plan view, forming a continuation of FIG. 1, of the main conveyor and grading section and the candling conveyor and table.
Figure 3:
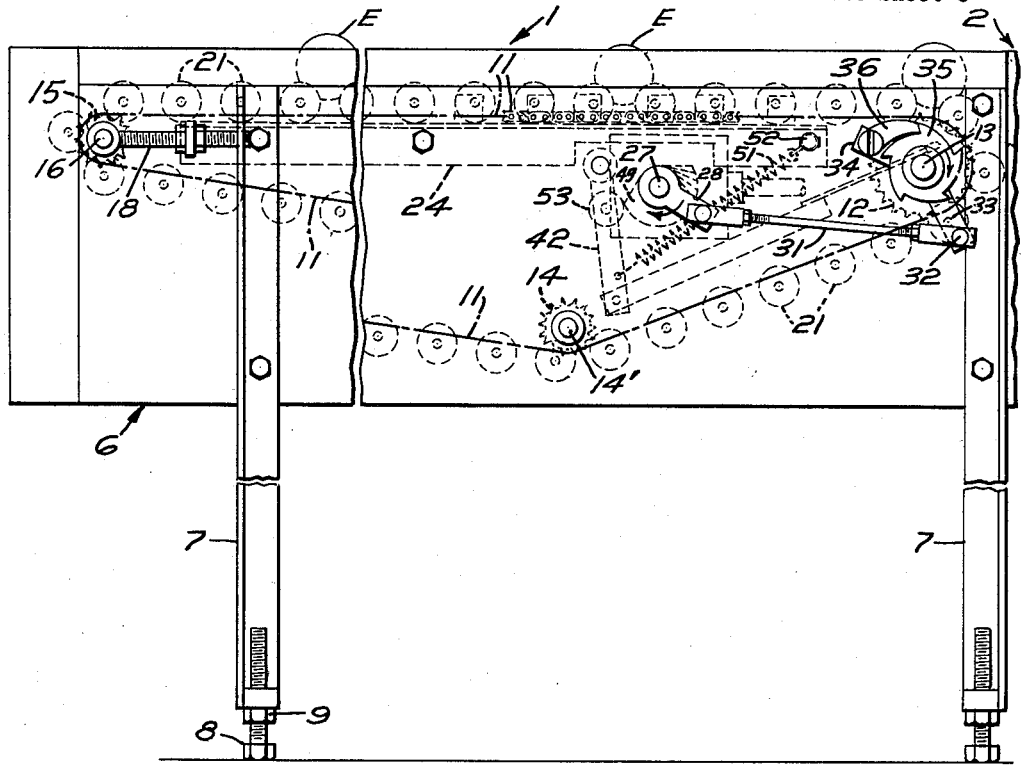
FIG. 3 is a side elevational view of the infeed conveyor drive mechanism.
Figure 5:
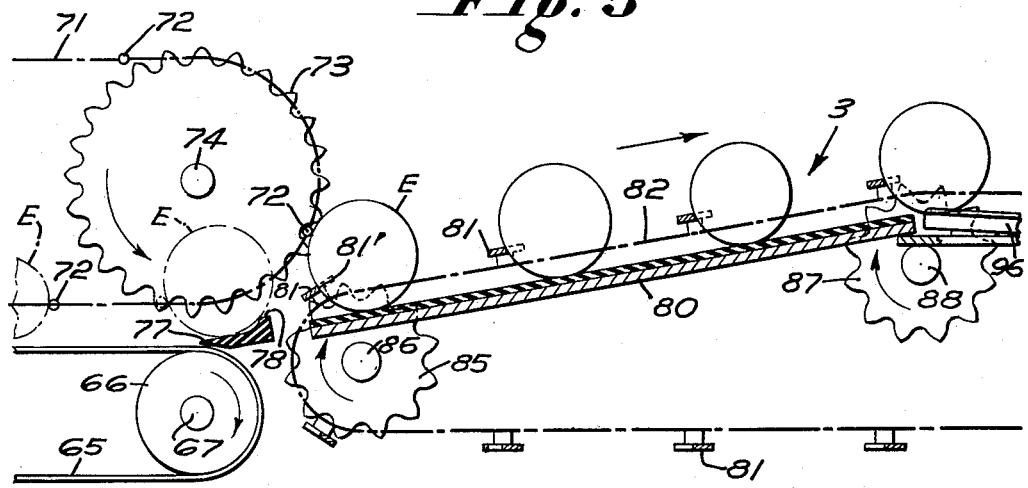
FIG. 5 is a generally schematic view illustrating the manner in which eggs are transferred from the cross feed conveyor to the main conveyor.

The cross feed conveyor, generally designated 2 and perhaps best shown in FIGS. 1, 4 and 5, comprises an endless belt 65 of for example three inch width training at one end around a drive roll 66 carried by a shaft 67 and at its other end around an idler roll 68 carried by a shaft 69. Above belt 65 is an endless roller chain 71, passing at one end around drive sprocket 73 on shaft 74 and at its other end around idler sprocket 75 on shaft 76, carrying pusher members in the form of an endless series of pins 72 extending across the egg-conveying flight of the belt 65 and having its corresponding flight traveling in the same direction so as to define a series of egg receiving spaces along the belt 65. Belt 65 and chain 71 with its pins 72 together comprise the cross feed conveyor, with belt 65 acting as a moving track for the eggs, and it will be appreciated that the movement of chain 71 is synchronized with the infeed conveyor so that the pins 72 present a separate egg receiving space along the egg conveying flight of belt 65 exactly opposite the respective pushers 44-49 as they push the eggs off the infeed conveyor. In other words, successive pairs of pins 72 define successive egg receiving spaces, and the two conveyors are synchronized so that these successive spaces are aligned with pushers 44-49 in that order and in time to receive the egg being transferred by the respective pusher, the next succeeding space moving toward alignment with pusher 44 as the infeed conveyor indexes.

Thus, the eggs occupy separate compartments on the cross feed conveyor and do not touch, and ledge 61 prevents them from rolling off the conveyor belt 65.

It will be noted that the eggs are pushed onto the belt 65 in longitudinal alignment therewith, whereas it is desired that they be aligned crosswise of the belt 65, and this desired alignment of the eggs on the crossfeed conveyor is accomplished in accord with my invention in the following manner.

Belt 65 is driven, in a manner to be described, faster than the chain 71, whereby an egg deposited on the belt 65 quickly catches up with the forward or leading pin, looking in the direction of movement thereof, of the pair of adjacent pins 72 defining the space occupied by such egg. The belt 65 continues to move faster than the pins 72 and thereby causes the egg to align itself lengthwise of the pin. Conveyor 65 delivers the eggs to a transfer station adjacent the main conveyor 3, at which point the eggs abut a bridge 77 (FIG. 5) forming a ledge against which the eggs bear for any necessary further movement into transverse alignment with respect to the belt 65.

The eggs, which have been bearing against the pins 72 immediately in front thereof, bear against the bridge 77 until the immediately following pins 72 push them onto the bridge, which can be covered with cushioning and gripping material such as rubber, and then over the upturned portion 78 at the outer end thereof onto the main conveyor.

The eggs are pushed by the pin 72 off the bridge 77 and onto an upwardly inclined, stationary shelf or track 80, which preferably is covered with a layer of rubber or like cushioning and gripping material, and the eggs are pushed upwardly along track 80 in the direction of the arrow (FIG. 5) by the pusher members or bars 81 carried by the main conveyor chain 82.

As with the pins 72, the pusher bars 81 extend transversely across the track 80, and the main conveyor track to be described, to define a series of egg receiving spaces between adjacent members 81, and it is a feature of my invention that cross feed conveyor chain 71 and main conveyor chain 82 are synchronized so that a pusher bar 81 engages each egg on track 80 against the lower half thereof at substantially the instant that the pusher pin 72 associated with that egg passes upwardly therefrom, as illustrated in FIG. 5, whereby the eggs are carefully and smoothly transferred from the cross feed conveyor 2 to the main conveyor 3 with a positive but gentle action.

Main chain 82 passes at one end around a drive sprocket 83 carried by a shaft 84, and at its opposite end around a sprocket 85 carried by the shaft 86. Intermediate its ends, the chain 82 passes around appropriate idler sprockets, such as shown at 87 on shaft 88, to properly position the chain with respect to the main conveyor ramp 80 and main track. Main chain 82 is a roller chain having lugs 90 on opposite sides thereof at spaced intervals therealong, and the pusher members 81 are connected to said lugs as by the bolts 91. In the illustrated embodiment, the chain 82 is made up of one-half inch roller chain and the lugs 90 are positioned every three inches therealong.

An ejector linkage is associated with each pusher member 81, and comprises substantially parallel arms 92 and 93 each pivoted at one end on a bolt 91 and at their opposite ends to an arm 94 of a pusher shoe 95. The arms 92 and 93 are spaced above member 81 by washers 91'. Normally the ejector linkage is folded back, as shown in full lines in FIG. 7, and it is extended or projected across the main conveyor track to eject an egg in a manner to be described.

The pusher members 81 roll the eggs up the inclined track 80, and it will be noted that each pusher member has a recess 81' of concave form in its front face, whereby the pushing action of the member 81 up the inclined track 80 has a straightening effect on the egg to align the same transversely of the main conveyor track. At the top of track 80, members 81 push the eggs onto the main conveyor track comprising a first track section 96' and a series of further track sections 96, arranged in spaced apart, end-to-end relation, and weighing scale platforms 105 therebetween. Chain 82 rides on a track 89, of for example a one-quarter inch square piece of steel, extending along the main conveyor track.

The track sections 96 and 96' are secured to a metal shelf member 97, extending substantially horizontally from a back wall member 98 of the main conveyor and grading section framework and welded or otherwise secured thereto, as by bolts 99, and each track section 96 has a relatively narrow incoming end portion of, for example, three-quarter inch width with the side walls thereof bent down to form a lower platform portion 101, the track section main body portions 102 flaring outwardly from their incoming ends to their outgoing ends to a width of, for example, one and one-eighth inches, and having their upper side wall portions turned out, as at 103, to provide an outwardly flaring track for the eggs. Track section 96' is identical with track sections 96 excepting only that it does not have the lower platform portion 101 but only the main body portion 102.

Once the eggs are pushed onto the main body portion track 103 crosswise thereof the outwardly flaring track enables the egg to roll therealong under the force of gravity toward the outgoing end thereof, and to further this action washers 104 or the like are placed under the incoming end of each track section to make it higher than the outgoing end thereof.

A particular feature of my invention resides in the manner in which the eggs are conveyed through the grading section, weighed and then ejected therefrom. Generally speaking, there are a number of weighing scale platforms, the illustrated embodiment having four scales and associated platforms, with the first scale of the series of scales being set for the heaviest grade of eggs, the next succeeding scale being set for the next heaviest grade, and so forth, whereby with four scales five grades of eggs, ranging from jumbo through large, medium, small and pullet are provided for. Each egg is conveyed to the first scale platform, and then to each succeeding scale platform, until it overbalances a scale and is ejected, it being understood that any egg too light to actuate the last scale, which is set for "small" eggs, is automatically classified and ejected as a pullet.

Figure 8:
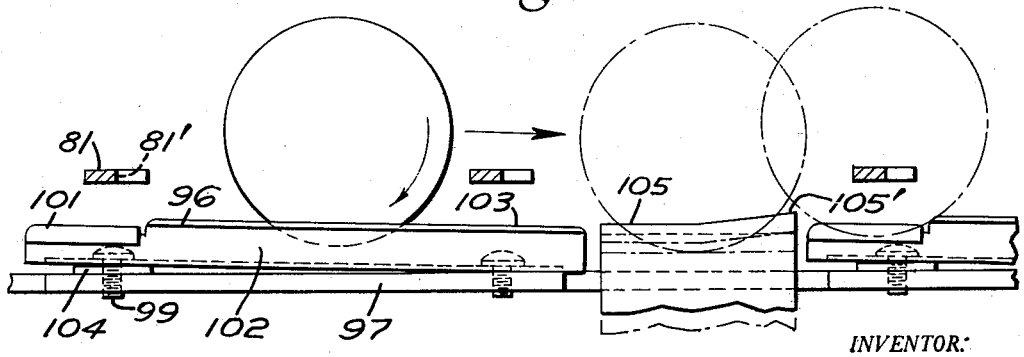
FIG. 8 is a schematic view illustrating the manner in which the eggs are moved along the main conveyor.

In accord with my invention, each egg is pushed up the inclined track 80 and onto the first track section 96' by a pusher member 81. When the egg is on the track 103 of section 96' it begins to roll along the track away from the trailing pusher member 81 of the pair thereof defining the space occupied by the egg (FIG. 8) until it abuts against the leading or forward pusher member 81 with respect thereto, which occurs just before the egg reaches the end of the track section 96' whereby the said leading pusher member 81 slows down the egg and gently lowers it onto the adjacent scale platform 105. It will be noted that the platform 105 has an elevated portion 105' at the forward end thereof with respect to the direction of travel of the egg, whereby the egg stays on the scale platform and the leading pusher member 81 moves away therefrom. During the interval when the egg is on the scale platform and neither the leading nor the trailing pusher member 81 is touching the egg, it is weighed in a manner to be described. Then, the trailing pusher member 81 again engages the egg and pushes it onto the platform portion 101 of the next succeeding track section 96, and then up onto the track 103 thereof, at which point the foregoing action is repeated, assuming in each case that the egg was not heavy enough to actuate the scale on which it was weighed.

Assuming then that the egg is of the "pullet" grade, this action will continue until the egg has moved past the last scale platform following which it will be ejected automatically into the pullet area of the candling section 4 in a manner to be described. However, assuming that the egg was sufficiently heavy to actuate the scale on which it was weighed, it will be ejected from the main conveyor onto the candling section after it has been pushed off the platform of that scale and onto the platform portion 101 of the next track section 96. In other words, the egg is never ejected over the scale platform which would tend to damage the scale. Also, it should be noted that as the trailing pusher member 81 pushes the egg from the platform portion 101 up onto the track 103 of the main body portion 103, there is a straightening action tending to align the egg crosswise of the track section 96.

Referring now in particular to FIG. 6, the weighing scales are identical and comprise in each instance a scale beam 107 carrying the platform 105 at one end thereof and a permanent magnet 108 at the opposite end thereof. The permanent magnet 108 is adapted, upon movement of the beam 107 to its overbalanced position illustrated in broken lines in FIG. 6, to actuate a control switch 109 which comprises a magnetic mercury switch, such as one made, for example, by the Mercoid Corporation.

There is a control switch 109 associated with each scale, and each switch 109 includes a pool of mercury 111, a first wire 112 extending into the mercury pool 111 and connected to one side of the supply line 161 through lead wire 113, and an armature 114 pivotally supported, as by a hair spring 115, and attracted by the magnet 108 when the scale beam is in its broken line position to move a wire carried at the lower end of the armature into the mercury pool to complete an energizing circuit through the switch 109. In other words, as the scale beam pivots to move magnet 108 to its broken line position, the magnet attracts the armature 114 to close the circuit through the switch 109. This provides a high degree of accuracy because there is no physical connection between the scale and its switch and no force on the part of the balancing device of the scale is required to operate the switch. The weighing platform 105 has a depending skirt portion 116 having a recessed body part terminating in a relatively slender extension 117. A pair of bearing members 118 extend vertically into holes in the body part of skirt portion 116 and are held loosely against spherical seats 119 by pins 121, members 118 having grooved bearing surfaces 122 receiving an upwardly facing first knife edge 123 carried adjacent the outer end of the beam 107. Hardened screws 124 extend inwardly from opposite sides of the skirt portion 116 to limit endwise movement thereof on the knife edge 123. Intermediate its ends, beam 107 carries a downwardly facing, second knife edge 125 adapted to engage in transversely spaced bearings 126 having grooved upper surfaces receiving the knife edge 125 and spherical seating surfaces resting in countersunk holes 127 formed in the main body portion 128 of the weighing scale mounting member. The bearings 126 extend loosely into the holes 127 and, with the spherical seating arrangement therebetween, can rock and give perfect alignment of the grooves with the knife edge 125 at all times, regardless of temperature changes or disturbances of any kind. Screws 129 carried by laterally spaced upstanding side wall portions 131 of the mounting member main body portion 128 limit endwise movement of the knife edge 125, and the knife edge preferably is of tapered end wall form bearing against the screws 129 with a point contact to avoid friction.

Screws 132 limit the swing of the beam 107, and adjustable weights 133 are provided to selectively adjust the weight for which the scale is balanced.

Extending beneath plate 97 are eight generally vertical plates 137 between which the weighing scales fit and which carry at their lower ends matching track members 138 having rearwardly and downwardly inclined track surfaces 139. The scale mounting member body portions 128 rest on pins 134 held down against track surfaces 139 by springs 135 which bear against plate 97, and it will be noted that each track surface 139 has a notch 140 which receives one of the pins 134 to releasably hold the scale firmly in place.

As seen in FIG. 2, the main body portion 128 of the scale mounting member is a horizontal platform having the rearward extension 131 which is laterally spaced from and generally parallel to the beam 107. Beam 107 and extension 131 extend through an opening in the back plate 98, and therebehind, and the switch 109 is carried in a bracket 142 on a plate 143 secured to the end of extension 131.

The scale platform is further connected to the mounting member by a check link 144 pivoted as at 145 to extension 117 and having its other end notched as at 146 to fit over a pin 147 carried between beveled washers 148. Pin 147 and washers 148 are carried by a plate 149 attached to the main body portion 128 of the scale mounting member by screws 151 tapped into the main body portion and also by two other screws 152 acting as set screws and tapped into the plate 149. This enables plate 149 to be adjusted up and down, and tipped from side to side to make it level, and the importance of this is to be able to adjust the check link 144 up and down so that the points of suspension thereof are exactly parallel to the points of suspension on the main knife edges 123 and 125. In this position the egg will weigh the same regardless of whether it is on the outer end of the platform 105 or the inner end thereof.

It should be noted that the pivot side of knife edge 123, on which the weighing platform or pan 105 rests, is approximately three-sixteenths inch above the pivot side of knife edge 125. This gives a quick acting, positive scale because as soon as knife edge 123 balances down the lever arm between the pivot points 123 and 125 increases while the lever arm to the weight decreases, so that as soon as the beam starts down it goes down against the stop 132 immediately.

Associated with each weighing scale is a solenoid actuated ejector linkage trip mechanism including in each instance a solenoid 154 carried by a bracket 155 suspended from a plate 156 secured to a bracket 158 on the back plate 98. Each solenoid 154 is connected to one terminal of its associated switch 109 through a lead wire 160, and to the other side of the supply line 161 through the lead wire 162. It will be appreciated that each solenoid and switch, and their associated connections and ejector linkage trip mechanism, are identical, whereby only one thereof will be described in detail.

The various switches 109 are connected in series with their associated solenoids 154, and the various units comprising the switches and their associated solenoids are connected in parallel. The solenoids 154 can be energized only at predetermined intervals as determined by a timer switch 166 in series with the source. A hub 163 is mounted on shaft 86 driven by the main conveyor chain, and has two permanent magnets 165 attached thereto in diametrically opposed relation. Switch 166 is a magnetic mercury switch corresponding to the switches 109 but having a larger capacity in that whereas switches 109 have, for example, a capacity of two-tenths ampere switch 166 has a capacity of one full ampere. Switch 166 is actuated whenever one of the magnets 165 is in a position to attract the armature thereof, and is secured on frame member 98 by a bracket 167.

In operation, the timer switch drive is synchronized with the main conveyor chain so that timer switch 166 is closed for an instant every time the eggs passing through the grading section are or normally would be on the scale platforms 105. Thus, after the eggs have been lowered onto the platforms 105 and the leading pusher members 81 have moved away therefrom, the weighing action occurs and during this short interval the magnets 165 occupy the position thereof illustrated in broken lines in FIG. 6 closing timer switch 166. If, during that interval, any scale is overbalanced by the egg on its platform the associated switch 109 will close to energize the solenoid 154 associated therewith and retract its armature 168.

The solenoids 154 are adapted to actuate an ejector trip mechanism, as follows.

The end of solenoid armature 168 is pivotally connected, as at 169, to the relatively short arm 170 of a bellcrank type of lever 171 pivoted at 173 and having a relatively long arm 171' extending at generally a right angle thereto. The lever arm 171' forms a cam track along its outer face portion, and whereas the parts normally assume the position thereof illustrated in broken lines in FIG. 7, upon energizing the solenoid 154 armature 168 is pulled in causing lever 171 to pivot and lever arm 171' to swing through an opening 172 in the back plate 98 and into the path of a cam lobe 93' formed on the inner end of the lever 93 of the egg ejecting linkage. Thus, looking now at FIG. 7, when the lever arm 171' is projected through the opening 172 it is in the path of the cam lobe 93' whereby as the leading pusher member 81 moves thereby the lobe 93' bears against arm 171' and causes the ejector linkage to swing shoe 95 to the main conveyor track.

Arm 171' is relatively long and has a curved surface, so that the egg is not ejected immediately but only after it has been pushed from the scale platform onto the next track section 96 by the trailing pusher member 81, whereby the egg is not pushed off over the scale platform and does not damage the knife edge supporting the same. To accomplish this, the egg is ejected by the ejector linkage of the leading pusher member 81 with respect thereto. Of course, if the egg on that scale platform does not overbalance the scale, the solenoid is not energized and the lever 171 remains retracted.

Because the solenoids 154 are energized only for an instant, some means must be provided for locking the lever arms 171' in projected position, and it is a particular feature of this invention that such means include means permitting the arm 171' to yield in the event that something prevents the arm 93 from swinging out across the track. Accordingly, I provide a second bellcrank 174 also pivoted at 173 and having an arm 174' in the path of a pin 175 carried by the arm 170 of lever 171, and a second arm 176 adapted to bear against the shouldered arm 177 of a latch lever 178 pivoted at 178'.

A heavy coil spring 179 is carried by the pivot post 173 with one end bearing against the pin 175 on the arm 170 of lever 171 and its other end bearing against a pin 180 on the arm 176 of lever 174 whereby levers 171 and 174 are yieldably interconnected normally to act in unison as one piece. A spring 182 extends between pin 175 and arm 177 of latch 178, so that when the armature 168 is retracted the arm 176 moves across the arm 177 and engages against the shoulder thereon, latching the parts in the position thereof shown in full lines in FIG. 7 even though solenoid 154 is immediately deenergized. However, even when the parts are latched in this position, if something prevents arm 93 from swinging out across the main conveyor track spring 179 will yield to permit arm 171′ to retract into opening 172 and thereby prevent damage to the parts.

Latch lever 178 has a release arm 183 which, when the trip mechanism is latched, is in the path of a boss 91′ surrounding one of the bolts 91 and extending above the egg pushing and ejecting mechanism. Accordingly, as the trailing pusher member 81, which pushed the ejected egg off platform 105 and onto track section 96, moves past the arm 183 its boss 91′ will pivot lever 178 against the action of spring 182 and spring 182 will cause the parts to move to their retracted position illustrated in broken lines in FIG. 7. In this regard, it should be noted that the outer end of arm 176 bears against arm 177 to hold latch 178 retracted out of the path of the bosses 91′, so that the machine runs quietly without any clicking noise at this point unless the solenoid is actuated to cock the ejector trip.

The ejected eggs are pushed off the platform 101 of the track sections 96 onto the candling conveyor at substantially the same level, and adjustable guide members 185 are provided to guide the egg as it moves onto the candling section 4.

As previously indicated, any egg reaching the end of the main conveyor and grading section is automatically ejected into the pullet area of section 4. To this end, there is no weighing scale set for eggs of pullet grade although a dummy scale platform 186 can be provided to permit use of identical track section 96 throughout. Instead of a solenoid 154, a lever corresponding to lever 171 with a similar arm 171′ is pivoted, as at 173′, on a bracket 189 and has an arm 170′ urged by a spring 187 against a stop 188 to project the arm 171′ through the opening 172 for actuating each ejector linkage in the aforesaid manner.

Figure 9:
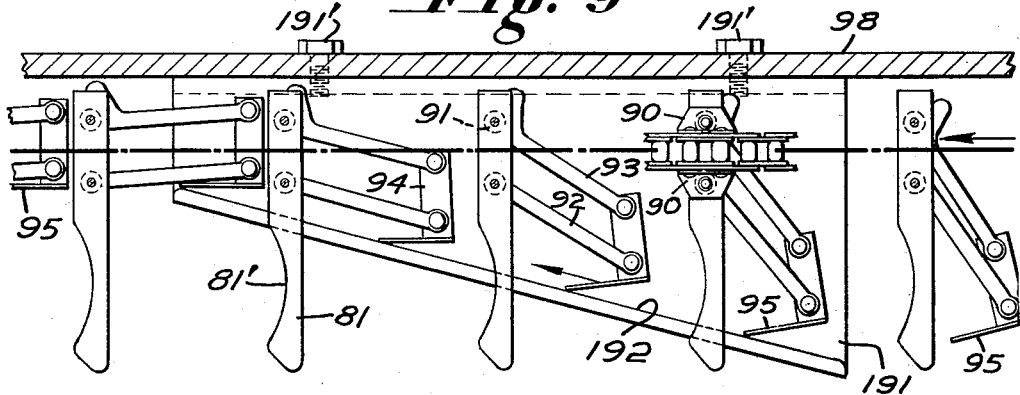
FIG. 9 is a detail view illustrating the manner in which the ejector mechanism is retracted.

With this arrangement, the ejector linkage mechanisms comprising the parts 92 through 95 are all extended or projected as they pass from the main conveyor and grading section to begin their return flight, and in accord with my invention means are provided to retract each of these mechanisms to their nested position before they reach their upper, egg-conveying flight and ramp 80. Such means are shown in FIG. 9 which is a plan view, looking down, of the main conveyor return flight, and comprise a bracket 191 secured to the rear frame part 98 as by bolts 191′ and carrying a cam section 192 against which the projected pusher shoes 95 bear and by which they are caused to retract as they move toward ramp 80.

The candling section 4 comprises an open, box-like frame mounted on appropriate legs and including an endless conveyor belt 194 training at the end thereof adjacent the scales about an idler roller having sprockets 195 and at its other end around a drive roller, having sprockets 197, carried on a shaft extending into the gear box 198. A tightening roller 199, journaled in vertically slotted brackets 200 on the frame of section 4, is provided to maintain the desired tension in the endless conveyor belt. The belt 194 has endless chains 194′ attached to the opposite sides thereof and training around the sprockets to provide a positive drive and to prevent creeping of the belt from one side to the other.

Two angles extend upwardly from the sides of the conveyor and support an angle 201 extending across the candling conveyor adjacent the scales. Swinging dividers 202, which divide the candling conveyor and table area 203 into five sections for receiving the different grades of eggs and keeping them separate, are pivoted on angle 201, and it will be seen that the ends of dividers 202 are of flexible material shown at 204 for brushing against the end wall of this area. The pivoted dividers 202 permit the relative size of the different areas in section 4 to be varied to match the relative number of eggs in each grade.

The entire machine is driven by a motor 206 which in a presently preferred embodiment comprises a one quarter horsepower gear head motor driven at 36 r.p.m. A roller chain 208 engages the motor drive sprocket 207 and passes around a drive sprocket 209 mounted on the roller shaft 84 to drive the main conveyor chain 82. The drive chain 208 also passes around the sprocket 211 which drives the shaft 212 extending into the gearbox 198 and engaging the shaft of roller 196 through the bevel gears therein, which gearing provides an increase in speed from one to two, whereas the gearing in the other gearbox 26 provides a reduction in speed from two to one. Drive chain 208 also passes around an idler sprocket 215 which acts as a tightener sprocket.

The main conveyor chain 82 drives the shaft 86 of the timer hub 163, and the shaft 86 carries a sprocket 217 around which a chain 218 passes. Chain 218 also passes around a tightener sprocket 219 and around the sprocket 221 driving the cross feed conveyor chain 71, the sprocket 222 driving the cross feed belt conveyor 65, and the sprocket 223 which drives the shaft 25.

Thus, my invention fully accomplishes the aforesaid objects. While only a presently preferred embodiment has been disclosed and described herein, my invention is not necessarily limited to the details thereof and instead I intend that my invention be defined by the appended claims.

Having fully disclosed and completely described my invention, together with its mode of operation, what I claim as new is:

1. In an egg grading machine, main conveyor track means comprising a plurality of spaced, stationary track sections disposed in longitudinally aligned relation, weighing scale platforms each positioned between a corresponding pair of adjacent track sections, said track sections being arranged so that eggs roll therealong toward the succeeding scale platform by gravitational action, and a series of movable pusher members extending transversely of said track means with adjacent of said members defining egg receiving spaces therealong, and drive means for said series of pusher members, said pusher members being spaced apart a distance so that an egg occupying the space between adjacent pusher members can be engaged by only one pusher member at a time and when pushed by the trailing one of said adjacent pusher members onto the first track section rolls down said first track section away from said trailing pusher member and bears against the leading one of said adjacent pusher members adjacent the exit end of said first track section and is gently lowered by said leading pusher member onto the scale platform adjacent the exit end of said first track section, said egg subsequently being pushed off said scale platform onto the next track section by said trailing pusher member, and means responsive to actuation by said scale platform for ejecting an egg laterally of the track as it is moved from the scale platform by a pusher member.

2. A machine as set forth in claim 1, and ejector control means for operating the last mentioned means and actuated by the weight of an egg on said scale platform during the interval when neither of said adjacent pusher members is touching the egg.

3. In an egg grading machine, main conveyor track means comprising track sections longitudinally aligned in end-to-end relation, weighing scale platforms between adjacent track sections, said track sections being arranged so that eggs roll therealong toward the succeeding scale platform by gravitational action, and a series of movable pusher members extending transversely of said track means with adjacent of said members defining egg receiving spaces therealong, and drive means for said series of pusher members, said pusher members being arranged and driven so that when an egg occupying the space between adjacent pusher members is pushed by the trailing one of said adjacent pusher members onto the first track section it rolls down said first track section away from said trailing pusher member and bears against the leading one of said adjacent pusher members adjacent the exit end of said first track section and is gently lowered by said leading pusher member onto the scale platform adjacent the exit end of said first track section, said egg subsequently being pushed off said scale platform onto the next track section by said trailing pusher member, an ejector linkage carried by said pusher members and comprising a pair of links pivoted thereon at spaced points therealong and carrying a shoe for swinging movement across said track sections, and means for projecting the ejector linkage of a leading pusher member after the trailing pusher member with respect thereto has pushed an egg therebetween from the scale platform onto the succeeding track section.

4. A machine as set forth in claim 3, together with conveyor means having an egg-conveying flight moving away from said track means at substantially the same level as said track sections at the point where eggs are ejected therefrom.

5. A machine as set forth in claim 3, the inside one of said links having a cam lobe, together with solenoid actuated ejector trip means comprising a solenoid, cam track means yieldably connected to the armature of said solenoid and adapted to project into the path of said lobes when said solenoid is energized, latch means automatically operable to hold said cam track means in projected position, and means for releasing said latch means after the ejector linkage has been actuated.

6. In an egg grading mechanism, longitudinally aligned track sections arranged in spaecd apart relation, a weighing scale platform therebetween, a series of pusher members extending across said track sections to define an egg receiving space threebetween, a weighing scale having a solenoid actuated egg ejector trip mechanism associated therewith, said scale platform being carried at one end of a scale beam carrying a permanent magnet, and energizing circuit means for each solenoid including magnetic first switch means in series therewith, said switch means being actuated by said permanent magnets when the scale is overbalanced by an egg thereon, timer switch means in series with said first switch means, and means closing said timer switch means when an egg is on said platform free of said pusher members.

7. In an egg grading machine, main conveyor means including a plurality of stationary track sections disposed in spaced, longitudinally aligned relation, a plurality of weighing means individually disposed between adjacent track sections, and pusher means for moving eggs of random weight along the main conveyor means for successive disposition on said weighing means, graded egg collection means disposed along one side of said conveyor means and including a plurality of collection stations for different grades of eggs, there being at least one weighing means associated with each of said collection stations, said pusher means including mechanism for selectively laterally deflecting and discharging an egg to said one side of the conveyor means to a selected one of said collection stations, each of said weighing means being responsive to a different predetermined egg weight corresponding to the collection station with which it is associated, each weighing means including a member for actuating said mechanism of the pusher means.

8. In an egg grading machine, main conveyor means including a plurality of track sections disposed in spaced, longitudinally aligned relation, weighing means including a scale platform disposed between each pair of spaced track sections, each track section being sloped downwardly toward the next successive scale platform to permit eggs to roll by gravity onto each scale platform, and transport means for moving eggs onto said track sections, said transport means comprising a plurality of fingers overlying said track sections and means for moving said fingers in unison in the direction of said track sections, said fingers being spaced apart a distance exceeding the width of an egg, each egg being moved onto a track section by the trailing one of a pair of fingers to then roll to and against the leading one of said pair of fingers and be lowered gently by the latter onto an associated scale platform.

9. In an egg grading machine, main conveyor means including stationary egg guiding mechanism and pusher means for moving eggs along said guiding mechanism, said guiding mechanism including a plurality of spaced track sections, each of which is sloped downwardly in the direction of egg travel, and a plurality of intervening scale platforms bridging between track sections, and mechanism carried by said pusher means for deflecting an egg laterally from the guiding mechanism in response to disposition of an egg exceeding a predetermined weight upon one of said scale platforms.

10. In an egg grading machine, main conveyor track means having a series of discharge areas laterally thereadjacent, said track means including a series of track sections disposed in longitudinally spaced and aligned relation, weighing means interposed between spaced track sections opposite respective ones of said discharge areas, actuating means connected with each weighing means and each weighing means being operative to actuate its respectively actuating means only upon attainment of a predetermined and different weight threshold value, pusher means for moving said eggs successively over said track sections and onto said weighing means, and mechanism carried by said pusher means and engaged by said actuating means when operated to deflect an egg laterally from said weighing means into one of said discharge areas.

References Cited in the file of this patent
UNITED STATES PATENTS

| | | |
|---|---|---|
| 1,728,463 | Wyland | Sept. 17, 1929 |
| 1,738,634 | Bryant | Dec. 10, 1929 |
| 2,020,511 | McHenry | Nov. 12, 1935 |
| 2,678,726 | Root | May 18, 1954 |
| 2,727,625 | Sneed | Dec. 20, 1955 |
| 2,835,386 | Marzolf | May 20, 1958 |
| 3,002,620 | Marzolf | Oct. 3, 1961 |